US011631142B2

(12) United States Patent
Rodoni

(10) Patent No.: US 11,631,142 B2
(45) Date of Patent: Apr. 18, 2023

(54) WASTE MANAGEMENT SYSTEM IMPLEMENTING FUEL TAX MONITORING

(71) Applicant: Rubicon Technologies, LLC, Lexington, KY (US)

(72) Inventor: Philip Rodoni, Decatur, GA (US)

(73) Assignee: Rubicon Technologies, LLC ( * ) Notice: Subject to any disclaimer, the term of this patent is extended or adjusted under 35 U.S.C. 154(b) by 0 days.

(21) Appl. No.: 17/020,518

(22) Filed: Sep. 14, 2020

(65) Prior Publication Data
US 2020/0410604 A1 Dec. 31, 2020

Related U.S. Application Data

(63) Continuation of application No. 16/208,540, filed on Dec. 3, 2018, now Pat. No. 10,776,884, which is a continuation of application No. 15/428,967, filed on Feb. 9, 2017, now Pat. No. 10,147,060.

(51) Int. Cl.
G06Q 40/10 (2023.01)
G06Q 50/26 (2012.01)
G01C 21/34 (2006.01)
G06Q 50/30 (2012.01)

(52) U.S. Cl.
CPC ......... *G06Q 40/10* (2013.01); *G01C 21/3469* (2013.01); *G06Q 50/26* (2013.01); *G06Q 50/30* (2013.01)

(58) Field of Classification Search
None
See application file for complete search history.

(56) References Cited

U.S. PATENT DOCUMENTS

| | | | | |
|---|---|---|---|---|
| 2005/0010479 A1* | 1/2005 | Hannigan | ............ | G06Q 20/207 |
| | | | | 705/30 |
| 2011/0202591 A1* | 8/2011 | Reis | ............... | G06Q 10/08 |
| | | | | 709/246 |
| 2014/0006329 A1* | 1/2014 | Hu | ............... | G06Q 50/06 |
| | | | | 706/46 |
| 2016/0139600 A1* | 5/2016 | Delp | ............... | B60K 37/06 |
| | | | | 701/26 |

FOREIGN PATENT DOCUMENTS

WO    WO-2009038864 A1 *  3/2009  ............. C11C 3/003

OTHER PUBLICATIONS

Ahn, Kyoungho and Rakha, Hesam; "The effects of route choice decisions on vehicle energy consumption and emissions," May 2008, Virginia Tech Transportation Institute, pp. 151-167 (Year: 2008).*

* cited by examiner

*Primary Examiner* — Amanda Gurski
(74) *Attorney, Agent, or Firm* — Kilpatrick Townsend & Stockton, LLP; Michael Morlock

(57) ABSTRACT

A system is disclosed for managing waste services. The system may have a provider portal, a locating device configured to generate a location signal indicative of a location of a service vehicle, and a central processing unit in communication with the provider portal and the locating device. The central processing unit may be configured to determine a total amount of fuel consumed by the service vehicle and to determine, based at least in part on the location signal, a portion of the total amount of fuel consumed by the service vehicle when the service vehicle is not traveling on public roadways. The central processing unit may be further configured to cause an indication of the portion of the total amount of fuel to be displayed on the provider portal.

15 Claims, 3 Drawing Sheets

US 11,631,142 B2

WASTE MANAGEMENT SYSTEM IMPLEMENTING FUEL TAX MONITORING

RELATED APPLICATIONS

This application is a continuation of U.S. application Ser. No. 15/428,967 filed on Feb. 9, 2017.

TECHNICAL FIELD

The present disclosure relates generally to a waste management system and, more particularly, to a waste management system implementing fuel tax monitoring.

BACKGROUND

Fuel taxes can be imposed by state and/or federal governments on the sale of fuel purposed for transportation. Revenue generated by the fuel taxes are theoretically used to improve transportation (e.g., to build and/or maintain roadways, bridges, etc.). The fuel taxes are meant to be paid by only those using government-funded transportation resources. Accordingly, credit may be given, in some instances, for taxes paid on fuel that is not purposed for transportation using government-funded transportation resources. For example, credit may be given for fuel consumed by machines operated on private property.

Waste service providers employ fleets of vehicles that perform a variety of services for their subscribing customers. During the normal course of business, some of these vehicles may operate on private property. For example, the vehicles may travel through parking lots owned by their customers, drive along private lanes, operate at privately owned landfills, etc. During this operation, the fuel consumed by the vehicles should not be taxed. Unfortunately, there has heretofore been no way to accurately track this operation and/or apply for the corresponding credit.

The disclosed system is directed to overcoming one or more of the problems set forth above and/or other problems of the prior art.

SUMMARY

In one aspect, the present disclosure is directed to a system for managing waste services. The waste management system may include a provider portal, a locating device configured to generate a location signal indicative of a location of a service vehicle, and a central processing unit in communication with the provider portal and the locating device. The central processing unit may be configured to determine a total amount of fuel consumed by the service vehicle and to determine, based at least in part on the location signal, a portion of the total amount of fuel consumed by the service vehicle when the service vehicle is not traveling on public roadways. The central processing unit may be further configured to cause an indication of the portion of the total amount of fuel to be displayed on the provider portal.

In another aspect, the present disclosure is directed to method for managing waste services. The method may include generating a location signal indicative of a location of a service vehicle, and determining a total amount of fuel consumed by the service vehicle. The method may further include determining, based at least in part on the location signal, a portion of the total amount of fuel consumed by the service vehicle when the service vehicle is not traveling on public roadways. The method may additionally include displaying an indication of the portion of the total amount of fuel on a provider portal.

In yet another aspect, the present disclosure is directed to a non-transitory computer readable medium containing computer-executable programmable instructions for performing a method of waste service management. The method may include generating location signals indicative of locations of a plurality of service vehicles, and referencing the location signals with maps stored in memory to determine when the plurality of service vehicles are not traveling on public roadways. The method may also include generating a fuel signal indicative of a total amount of fuel consumed by the plurality of service vehicles and determining, based at least in part on the location signals, a portion of the total amount of fuel consumed by the plurality of service vehicles when the plurality of service vehicles are not traveling on public roadways. The method may further include displaying an indication of the portion of the total amount of fuel on a provider portal.

DETAILED DESCRIPTION

Figure 1:
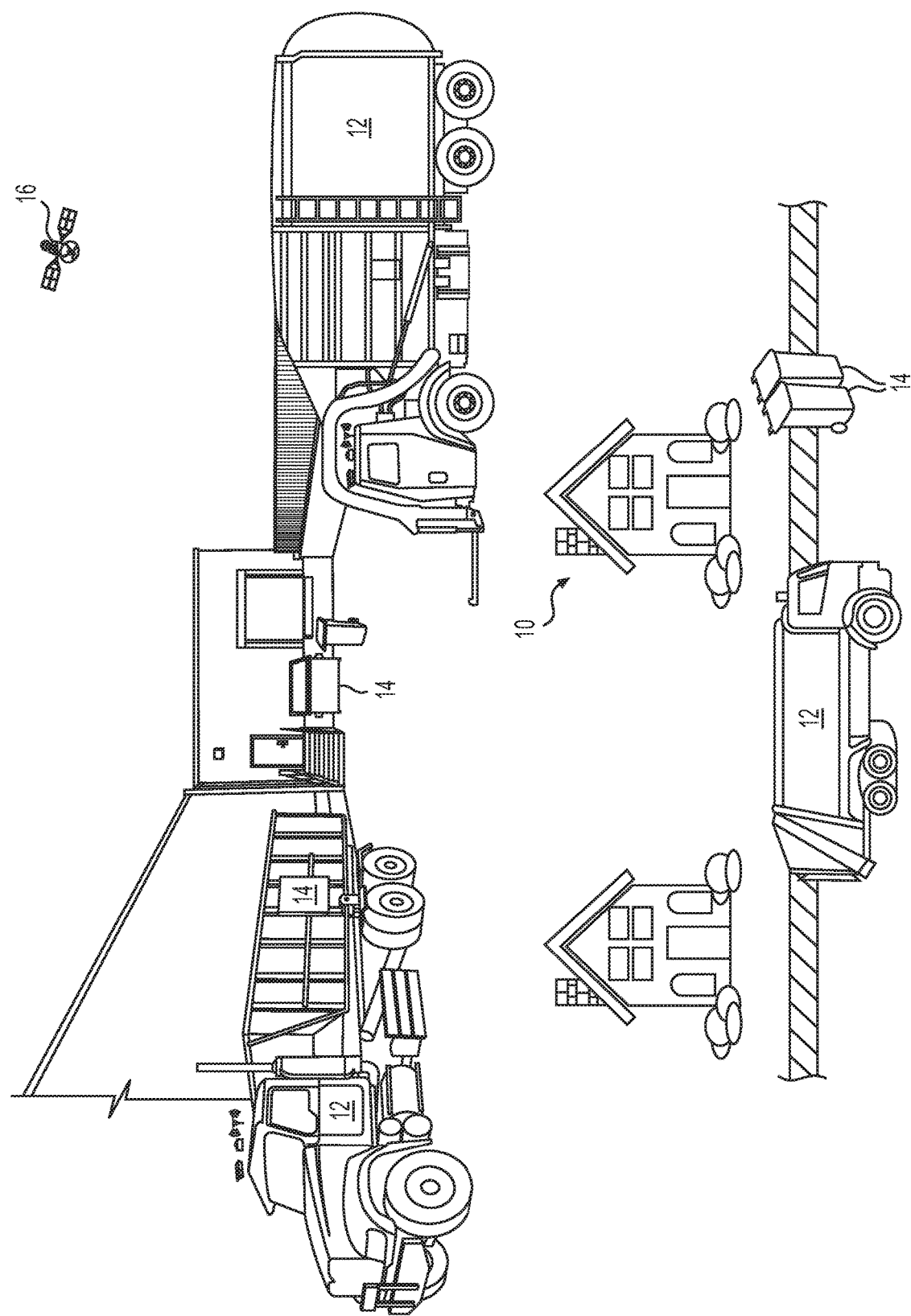
FIG. 1 is a perspective illustration of an exemplary disclosed waste service environment.

FIG. 1 illustrates an exemplary waste service environment ("environment") 10, at which one or more vehicles 12 are providing service for any number of different customers. Environment 10 could stretch over a wide area and include, for example, a retail store, a factory, a government building, a residential address, and/or another location having one or more receptacles 14 that require the services of vehicles 12. The services may include, for example, the removal of waste materials from inside of receptacle(s) 14; the transportation of the waste materials and/or receptacles 14 to a landfill, recycling center, or sorting facility; containment and/or treatment of hazardous waste materials; waste cleanup; etc.

Vehicles 12 may embody haul trucks (and/or trailers that are attachable to the haul trucks), which include or otherwise carry a storage compartment for holding waste materials. As is known in the art, the storage compartment may have a rear, side, and/or top hatch for receiving materials from receptacles 14, and the waste materials may be manually, automatically, or semi-automatically loaded into the storage compartment of a particular vehicle 12 via the corresponding hatch. For example, management personnel may be able to manually lift and tilt receptacles 14 into the storage compartment of a rear-hatch vehicle 12, thereby emptying receptacle 14 of the associated waste. In another example, vehicles 12 may include mechanical, electrical, and/or hydraulic systems configured to automatically grasp, lift, tilt, and thereby empty receptacles 14 into vehicle 12 via a top-hatch. In yet another example, some tasks (e.g., grasping) may be completed manually and other tasks (e.g., lifting and tilting) may be completed with the assistance of the mechanical, electrical, and/or hydraulic systems via a side-hatch of vehicle 12. In a final example, receptacle 14 may simply be loaded (e.g., manually, automatically, or semi-automatically) together with the waste contents onto vehicle 12 and transported away for emptying at another location.

As each vehicle 12 moves about environment 10, a satellite 16 or other tracking device may communicate with an onboard controller 30 (shown only in FIG. 2) to monitor the movements of vehicle 12 and the associated changes made to environment 10 (e.g., pickup, transporting, dumping, placing, etc.). As will be explained in more detail below, onboard controller 30 may network with a central processing unit ("CPU") 32 (e.g., a processing unit located in a back office or other service facility), which may then manage service activities of each vehicle 12 based on these movements and changes.

Onboard controller 30 may include means for monitoring, recording, storing, indexing, processing, communicating and/or controlling other onboard and/or offboard devices. These means may include, for example, a memory, one or more data storage devices, a central processing unit, or any other components that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Figure 2:
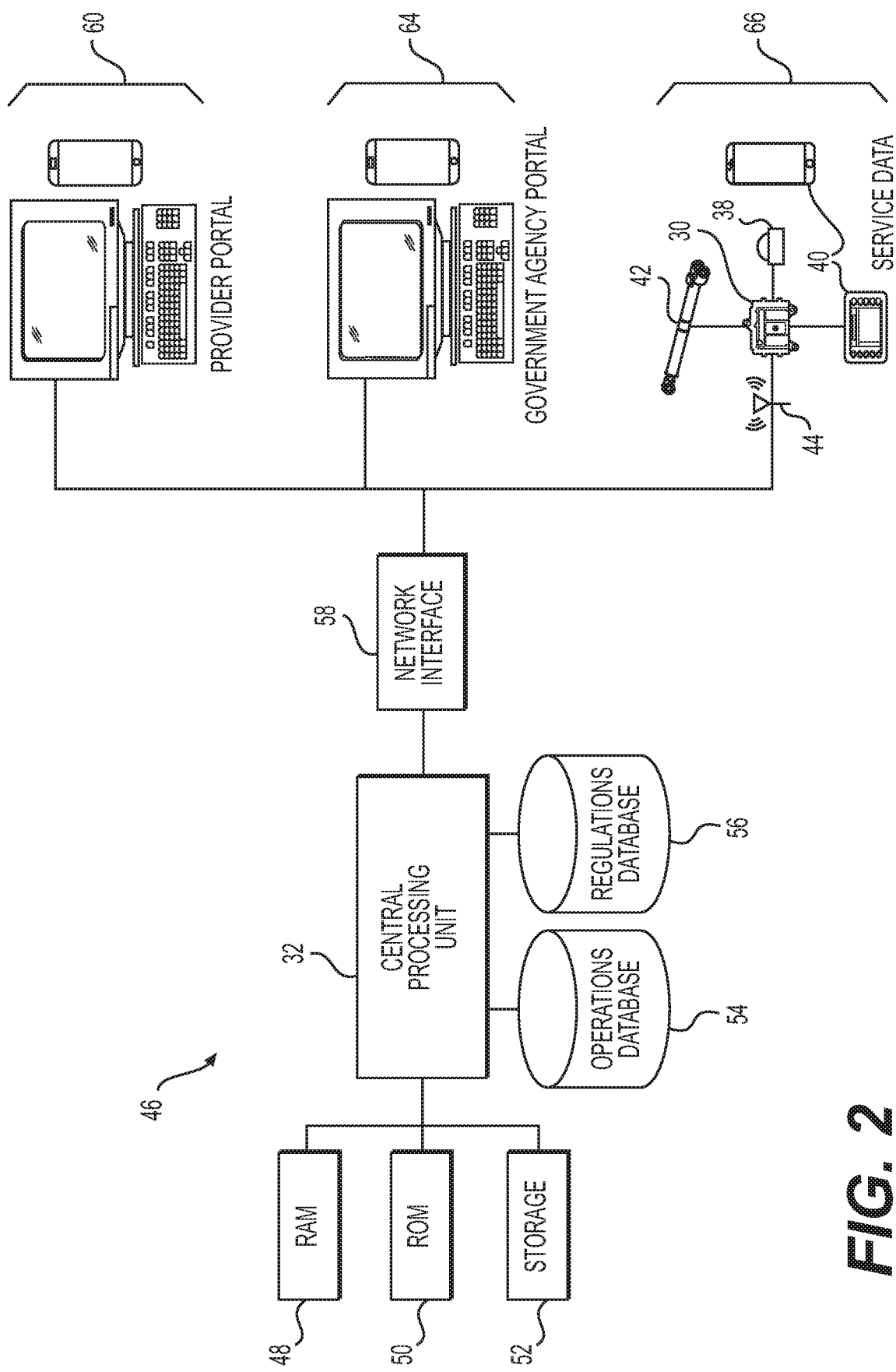
FIG. 2 is a diagrammatic illustration of an exemplary disclosed system that may be used to manage the services depicted in FIG. 1.

Onboard controller 30 may be configured to track, assist, and/or control movements of the associated vehicle(s) 12. As shown in FIG. 2, in addition to onboard controller 30, each vehicle 12 could additionally include a locating device 38, and at least one of a manual input device 40 and a sensor 42. In some embodiments, vehicle 12 is equipped with both manual input device 40 and one or more sensors 42. Onboard controller 30 may be in communication with each of these other components and/or with CPU 32 at the back office (e.g., via a communication device 44), and configured to determine, based on signals from these components and based on other known information stored in memory, operational characteristics of each vehicle 12. The operational characteristics may include among other things, a vehicle identification, a location, a speed, an origination, a destination, a fuel consumption rate and/or amount, and other service-related data.

Locating device 38 may be configured to generate signals indicative of a geographical position and/or orientation of vehicle 12 relative to a local reference point, a coordinate system associated with environment 10, a coordinate system associated with Earth, or any other type of 2-D or 3-D coordinate system. For example, locating device 38 may embody an electronic receiver configured to communicate with satellites 16 (referring to FIG. 1), or a local radio or laser transmitting system used to determine a relative geographical location of itself. Locating device 38 may receive and analyze high-frequency, low-power radio or laser signals from multiple locations to triangulate a relative 3-D geographical position and orientation. Based on the signals generated by locating device 38 and based on known kinematics of vehicle 12, onboard controller 30 may be able to determine in real time the position, heading, travel speed, acceleration, and orientation of vehicle 12. This information may then be used by onboard controller 30 and/or CPU 32 to update the operational characteristics of vehicles 12.

Input device 40 may provide a way for an operator of vehicle 12 to input information regarding observances made while traveling around environment 10. For example, the operator may be able to enter information about a location currently being serviced, information about a roadway currently being traveled, information about a bridge that vehicle is driving over, information about a boundary (e.g., a state line) being crossed, information about fuel (e.g., a date, time, grade, amount, etc.) being pumped into vehicle 12, etc. The information may be input in any number of ways, for example via a cab-mounted touch screen interface, via one or more buttons, via a keyboard, via speech recognition, via a smartphone carried by the operator, or in another manner known in the art. In some embodiments, in addition to receiving manual input from an operator, input device 40 may also be capable of displaying information, for example an electronic map of environment 10, a schedule, directions, instructions from the back office, corresponding regulations, etc.

Sensors 42 may be configured to monitor parameters associated with the operation of vehicle 12, and to generate signals indicative thereof. Each of these sensors 42 may be any type of device known in the art, and located anywhere on or in vehicle 12. In one example, sensor 42 may embody a fuel sensor configured to detect an amount of fuel being onloaded, a grade of the fuel, a fuel consumption rate and/or amount, or another fuel-related parameter. In another example, sensor 42 may be a powertrain sensor configured to generate signals indicative of a number of miles traveled by vehicle 12, an average speed for each driven mile, an engine load, an engine fuel setting, an engine speed, or another related parameter that could then be used to calculate one or more of the fuel parameters listed above. Other types of sensors could alternatively or additionally be employed.

Onboard controller 30 may be configured to manage communications between other onboard components and CPU 32 located at the back office. For example, onboard controller 30 may receive signals from locating device 38, input device(s) 40, and sensor(s) 42, and correlate the signals, filter the signals, buffer the signals, record the signals, or otherwise condition the signals before directing the signals offboard via communication device 44.

Communication device 44 may be configured to facilitate communication between onboard controller 30 and CPU 32. Communication device 44 may include hardware and/or software that enable the sending and/or receiving of data messages through a communications link. The communications link may include satellite, cellular, infrared, radio, and any other type of wireless communications. Alternatively, the communications link may include electrical, optical, or any other type of wired communications, if desired. In one embodiment, onboard controller 30 may be omitted, and CPU 32 may communicate directly with locating device 38, input device(s) 40, and/or sensor(s) 42 via communication device 44, if desired. Other means of communication may also be possible.

As shown in FIG. 2, onboard controller 30 (along with the other connected onboard components) and CPU 32 may each form a portion of a waste management system ("system") 46 configured to generate, maintain, analyze, compare, send, solicit, confirm, display, receive and/or record information associated with the disclosed concepts. System 46 may include, for example, a random access memory (RAM) 48, a read-only memory (ROM) 50, a storage 52, at least one database (e.g., an operations database 54 and a regulations database 56), a network interface 58, and at least one user portal (e.g., a provider portal 60, a government agency portal 64, and a service portal 66). As will be explained in more detail below, CPU 32 may be configured to receive data from different users via portals 60-66, and to compare, process, record, and share the data with the same and/or with other users via the same or different portals. It is contemplated that system 46 may include additional, fewer, and/or different components than those listed above. It is understood that the type and number of listed devices are exemplary only and not intended to be limiting.

CPU 32 may include an arrangement of electronic circuitry configured to perform arithmetic, logic, input/output, and control operations during sequential execution of pre-programmed instructions. The instructions may be loaded from ROM 50 into RAM 48 for execution by CPU 32. It should be noted that, although CPU 32 is shown and described as a single "unit", it is contemplated that the functions of CPU 32 could alternatively be completed by any number of co-located or remotely distributed and cooperating processing units, as desired. Numerous commercially available microprocessors may be configured to perform the functions of CPU 32. Further, the microprocessors may be general-purpose processors or specially constructed for use in implementing the disclosed concepts.

Storage 52 may embody any appropriate type of mass storage provided to hold information that CPU 32 may need in order to perform the disclosed processes. For example, storage 52 may include one or more hard disk devices, optical disk devices, or other storage devices that provide sufficient storage space.

Databases 54 and/or 56 may contain any information relating to particular waste service vehicle and regulatory records under analysis. The information stored within databases 54 and/or 56 may come from multiple different sources and be provided at any time and frequency. For example, the information could be manually entered by service provider employees, manually entered by governmental agency employees, and/or automatically entered by onboard controller 30. The information may be entered live (e.g., as the information is collected and/or observed by a vehicle operator), entered based on a predetermined schedule (e.g., based on regular downloads of regulation data), continuously streamed (e.g., via a live link to regulation information), intermittently pulled from "the cloud" (e.g., from social media posts about applicable regulations), or obtained in any other manner at any other time and frequency. In addition to the waste service and regulatory information, databases 54 and/or 56 may also include analysis tools for analyzing the information stored therein. CPU 32 may use databases 54 and/or 56 to make comparisons and/or determinations regarding relationships and/or trends relating to particular customers, service vehicles 12, service vehicle drivers, locations, regulations, uses of system 46, and other such pieces of information. CPU 32 may pull information from databases 54 and/or 56, manipulate the information, and analyze the information. CPU 32 may also update the information, store new information, and store analysis results within databases 54 and/or 56, as desired.

CPU 32 may communicate with a user of system 46 (e.g., a user accessing portal 60) via network interface 58. Network interface 58 may include, alone or in any suitable combination, a telephone-based network (such as a PBX or POTS), a local area network (LAN), a wide area network (WAN), a dedicated intranet, and/or the Internet. Further, the network architecture may include any suitable combination of wired and/or wireless components. For example, the communication links may include non-proprietary links and protocols, or proprietary links and protocols based on known industry standards, such as J1939, RS-234, RP1210, RS-422, RS-485, MODBUS, CAN, SAEJ1587, Bluetooth, the Internet, an intranet, 802.11 (b, g, n, ac, or ad), or any other communication links and/or protocols known in the art.

Each of portals 60-66 can include one or more of a router, an Ethernet bridge, a modem (e.g., a wired or wireless modem), or any other conventional computing components known in the art (not shown) such as a processor, input/output (I/O) ports, a storage, and a memory. The processor of each portal 60-66 can include one or more processing devices, such as microprocessors and/or embedded controllers. The storage can include volatile or non-volatile, magnetic, semiconductor, tape, optical, removable, non-removable, or other type of computer-readable medium or computer-readable storage device. The storage can be configured to store software programs (e.g., apps) downloaded from CPU 32 via network interface 58 and/or other information that can be used to implement one or more of the disclosed processes. The memory can include one or more storage devices configured to store the downloaded information. Each of portals 60-66 may be able to communicate with CPU 32, with databases 54 and/or 56, and/or directly with each other via network interface 58.

Each of portals 60-66 may provide a graphical user interface (GUI) that is configured to display information to users thereof, and that includes a means for receiving input from the user. In one embodiment, an exemplary portal is a computer (e.g., a laptop or desktop computer) having a console and a keyboard/mouse. In another embodiment, an exemplary portal is a handheld mobile device, such as a smart phone or a tablet having a touchscreen display and/or a keyboard. Other types of portals may also be utilized. The GUI of portals 60-66 may allow the user to receive (e.g., visually and/or audibly) information from system 46 via network interface 58, to upload information to system 46, and/or to correspond with other users of system 46.

Portal 60 may be dedicated for use by an employee and/or service provider representative of system 46 (e.g., a regulatory controller, an account representative, a service manager, etc.). It is contemplated that any number of portals 60 may be simultaneously connected to network interface 58 for use by any number of different users. Each such portal 60 may allow the representative to log into system 46 (e.g., via a web-based program, an internet site, or a mobile app) and to monitor a particular service event (e.g., a historic event or a live event, such as transportation of vehicle 12 at a customer location during waste pickup, during travel along public and/or private roadways, and/or during drop off or dumping at a public or privately owned disposal location), to view a tax-related regulation (e.g., use of a particular roadway, property lines, maps, governmental boundaries, the governing authority for a particular location, etc.), to compare aspects of particular service events to aspects of particular regulations, to view public-provided observations of regulations, to alert operators of tax-related issues (e.g., to provide an optional route that could reduce fuel tax liabilities), to reward and/or penalize operators for compliance-related activities (e.g., for following suggested routes), to share (e.g., publish, post, email, send, announce, etc.) tax-related information with the government agencies, and/or for other similar purposes.

Government agency portal 64 may be dedicated for use by a government agency representative (e.g., a representative responsible for fuel-tax regulations). It is contemplated that any number of portals 64 may be simultaneously connected to network interface 58 for use by any number of different representatives associated with the same or different government agency (e.g., by a federal, state, or local agency).

Each such portal 64 may allow the representative to log into system 46 (e.g., via a web-based program, an internet site, or a mobile app) and to view regulations existing in database 56, to update the regulations, to remove regulations, and to respond to open inquiries regarding past, current, and/or proposed regulations.

Portal 64 may also be used to inform the government agencies. For example, fuel-use information regarding how and/or where particular service vehicles 12 operate and comply with existing fuel-tax regulations may be provided to the corresponding government agency via portal 64.

Service portal 66 may be dedicated to the input of information generated onboard vehicles 12 and/or for the general use by vehicle operators. In some examples, the information is automatically provided by way of locating device 38 and sensor(s) 42. In other examples, the information is manually provided by way of input device(s) 40. The information may include, for example, the location of each vehicle 12, a travel path, a schedule of stops, an origination of waste material being transported by a particular service vehicle 12, a route of the service vehicle, a destination, information regarding fuel onloading (e.g. where, when, how much, which grade, etc.), and other information. It is contemplated that the functionality of service portal 66 could alternatively be provided by way of provider portal 60 (or another portal), if desired.

Portal 66 may also be used to inform and/or alert particular service vehicle operators. For example, fuel-tax information regarding particular service vehicles 12 and/or service vehicle operators may be provided via portal 64, along with corresponding rewards and/or penalties (e.g., financial, opportunity, and/or ranking rewards and penalties).

Based on the information received from portals 60-66, CPU 32 can be configured to execute instructions stored on computer readable medium to perform methods of waste service management at environment 10. For example, CPU 32 may be configured to monitor service as it is being performed, to compare the service to applicable fuel-tax regulations, and to provide feedback (e.g., to the service provider, the operators, the government agencies, etc.) based on the monitored service, the regulations, and the comparisons. This process is illustrated in FIG. 3, and will be explained in more detail in the following section to further illustrate the disclosed concepts.

INDUSTRIAL APPLICABILITY

The disclosed system may be applicable to the waste service industry, where service vehicles 12 frequently operate across overlapping private and public boundaries. The disclosed system may consider operational characteristics of individual service vehicles 12 and fuel-tax regulations from different agencies, and produce tax-related data. The tax-related data may be supplied to the service provider so that the service provider may apply for corresponding fuel tax credits. Alternatively, the disclosed system may automatically apply for the corresponding fuel tax credits by interacting directly with the different governmental agencies based on the tax-related data. Operation of system 46 will now be described with reference to FIG. 3.

Figure 3:
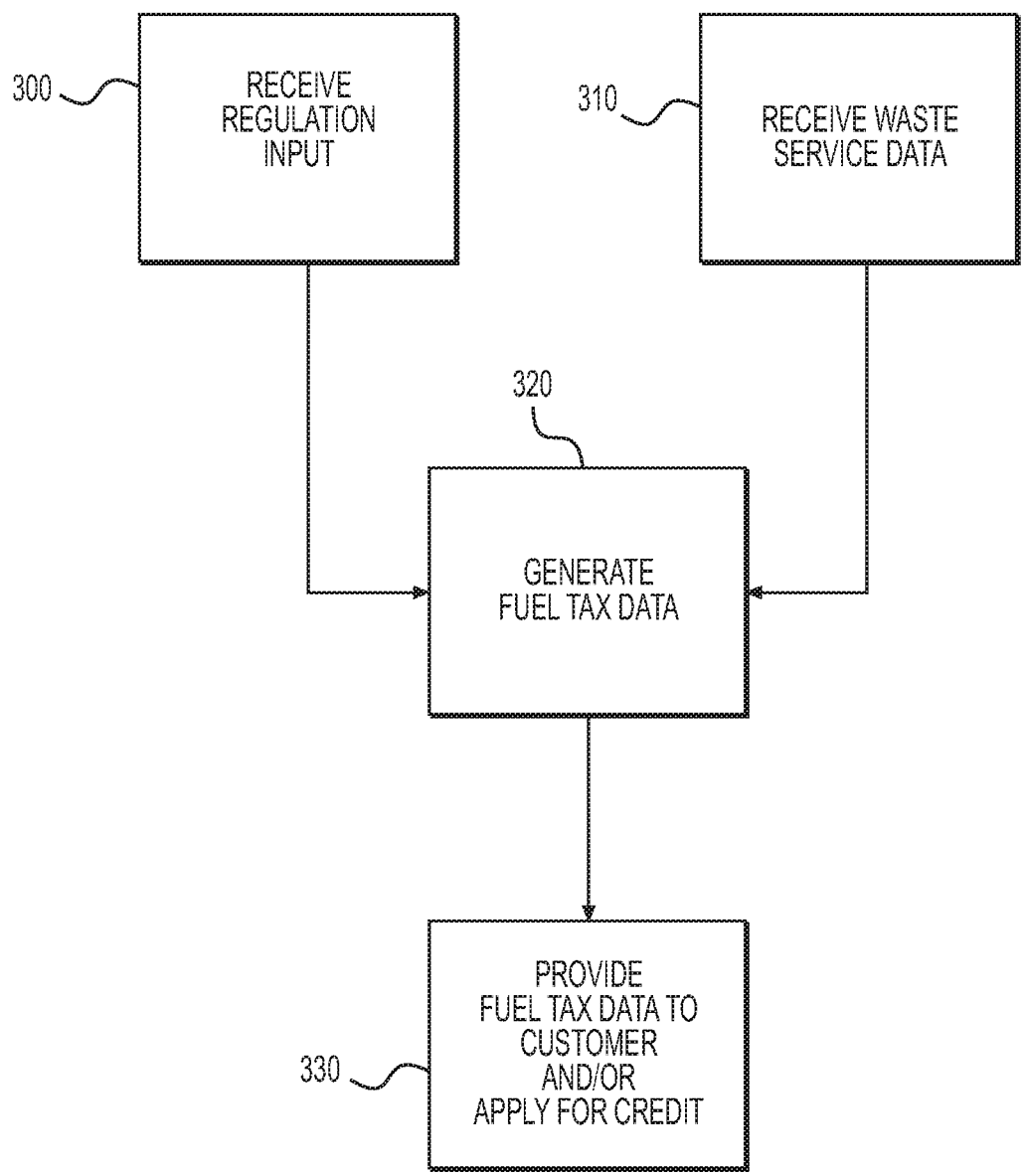
FIG. 3 is a flowchart depicting an exemplary disclosed method that may be performed by the system of FIG. 2.

As shown in FIG. 3, operation of system 46 may begin with the receipt of fuel-tax regulations by CPU 32 (Step 300). As described above, this input may include regulations pertaining to a particular roadway, municipality, area, region, county, state, and/or federal government that are received via portal 64. For example, a governmental regulatory controller may provide weekly updates regarding fuel-tax changes associated with the transportation of particular vehicles on particular roadways. The input may also be associated with changes in property ownership and/or boundaries, as registered at with the responsible governmental agency. As also described above, the input received at step 300 may be received at any time, intermittently, periodically, and/or continuously. The input received at step 300 may be stored, for example, within regulations database 56.

Simultaneous with the receipt of fuel-tax regulations and/or other input from the governmental agencies, service data may be received by CPU 32 (Step 310). As described above, this data may be provided via portal 66 and include, for example, data monitored from onboard service vehicle 12. This data could include, among other things, a vehicle identification, a waste origination, a pickup schedule, a transportation route, tracked location information, a waste destination, a speed, a fuel usage rate and/or amount, a fuel type, a fuel purchase amount and/or cost, etc. The service data may be provided by locating device 38, by the operator of service vehicle 12 (e.g., via input device 40), and/or by sensor(s) 42. The service data may be transmitted live by onboard controller 30 to CPU 32 (e.g., via communication device 44) and/or downloaded at any appropriate time. The waste service data received at step 310 may be stored, for example, within operations database 54.

CPU 32 may then be configured to compare the service data stored in operations databased 54 with the fuel-tax regulations stored in regulations database 56 to determine a fuel tax liability and/or a corresponding fuel tax credit associated with a particular service vehicle 12 and/or an entire fleet of vehicles 12 (Step 320). In particular, CPU 32 may be configured to determine where each vehicle 12 has traveled, how much of the travel was performed on public roadways or private property, and a corresponding amount of fuel consumed during the travel. For example, during completion of a particular service route, CPU 32 may determine (e.g., based on a comparison of signals from locating device 38 and electronic maps stored in memory) that a particular service vehicle 12 traveled 75% of its route on public roads and bridges, and 25% of its route on parking lots, private roads, private landfill property, etc. In this example, CPU 32 may calculate the amount of fuel consumed by vehicle 12 during its 25% travel on the private property. The service provider should not be liable for taxes paid on this amount of fuel.

CPU 32 may be configured to provide the tax-related data (e.g., the travel and corresponding fuel consumption data) to the service provider and/or automatically apply for the corresponding credit against already paid taxes (Step 330). In particular, the data may be provided daily to the service provider for each vehicle 12 being tracked, and the service provider may sum similar data from all vehicles 12 within its fleet for the current year (or another specified period of time) and then manually apply for the corresponding credit. Alternatively, CPU 32 may sum the data throughout the year and automatically apply for the corresponding credit at the appropriate time (e.g., via portal 64).

The disclosed system may improve profitability for waste service providers and also help them to understand the operations being performed by each vehicle within its fleet. For example, the disclosed system may help the service providers obtain fuel tax credits that could not heretofore be realized. In addition, the disclosed system may show the service providers exactly where their fleets operate, allowing the service providers to make route adjustments that could further improve profitability. For example, the disclosed system may provide and/or recommend opportunities to reroute particular service vehicles 12, such that those vehicles 12 operate a lower amount of time on public roadways. In some embodiments, CPU 32 may automatically reroute a particular vehicle 12 so as to lower the amount of time spent traveling on public roadways. This may help to reduce the fuel-tax burden for these service providers.

It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A system for reducing fuel tax costs, the system comprising:
    a non-transitory memory;
    one or more processors coupled to the non-transitory memory and configured to execute instructions to perform operations comprising:
        receive data related to a real time location of one or more service vehicles during operation from an electronic receiver configured to triangulate the real time location of the one or more service vehicles based on signals received from three or more satellites, and collect real time amounts of fuel consumed by the one or more service vehicles during operation, pickup schedules of the one or more service vehicles, and transportation routes of the one or more service vehicles;
        determine, based on the data related to the location of the one or more service vehicles during operation and the data related to the amounts of fuel consumed by the one or more service vehicles during operation, a portion of the amounts of fuel consumed by each of the one or more service vehicles when the one or more service vehicles are not located on public roadways;
        determine a fuel tax paid on the amounts of fuel consumed by the one or more service vehicles;
        determine a portion of the fuel tax that should be credited back based on the portion of the amounts of fuel consumed by the one or more service vehicles when the one or more service vehicles are not located on public roadways;
        cause an indication of the portion of the fuel tax that should be credited back to be displayed on a provider portal;
        automatically apply for the portion of the fuel tax that should be credited back;
        determine based on data related to real time location, the pickup schedules of the one or more service vehicles, and transportation routes of the one or more service vehicles an updated route to operate a lower amount of time on public roadways; and
        update the provider portal with the updated route.

2. The system of claim 1, further including at least one fuel sensor coupled to the one or more processors, the at least one fuel sensor being configured to generate a fuel signal indicative of the amounts of fuel consumed by a first service vehicle of the one or more service vehicles, wherein the one or more processors are further configured to determine the amounts of fuel consumed by the first service vehicle based at least in part on the fuel signal.

3. The system of claim 2, wherein: a first locating device of the one or more locating devices and the at least one fuel sensor are located onboard the service vehicle.

4. The system of claim 2, wherein the one or more processors are further configured to detect using the at least one fuel sensor, an amount of fuel being onloaded, a grade of the fuel, and fuel consumption rate.

5. The system of claim 1, further including a government agency portal, wherein the one or more processors are further configured to receive information regarding fuel tax regulations via the government agency portal.

6. The system of claim 1, further including an input device located onboard a first service vehicle of the one or more service vehicles and configured to receive manual input indicative of observed operation of the first service vehicle, wherein the one or more processors are configured to determine when the first service vehicle is not operating on public roadways based further on the manual input.

7. The system of claim 1, wherein:
    the one or more processors are configured to:
        sum all of the portions of the amounts of fuel consumed by each of the one or more service vehicles when not operating on public roadways; and
        automatically apply for corresponding credits at a scheduled time.

8. A method for reducing fuel tax costs, the method including one or more processors and memory configured to execute instructions comprising: receiving data related to a real time location of one or more service vehicles during operation from an electronic receiver configured to triangulate the real time location of the one or more service vehicles based on signals received from three or more satellites, and collecting real time amounts of fuel consumed by the one or more service vehicles, pickup schedules of the one or more service vehicles, and transportation routes of the one or more service vehicles; determining, based on the data related to the location of the one or more service vehicles during operation and the data related to the amounts of fuel consumed by the one or more service vehicles during operation, a portion of the amounts of fuel consumed by each of the one or more service vehicles when the one or more service vehicles are not located on public roadways; determining a fuel tax paid on the amounts of fuel consumed by the one or more service vehicles; determining a portion of the fuel tax that should be credited back based on the portion of the amounts of fuel consumed by the one or more service vehicles when the one or more service vehicles are not located on public roadways; displaying an indication of the portion of the fuel tax that should be credited back to be displayed on a provider portal; automatically applying for the portion of the fuel tax that should be credited back; determining based on data related to real time location, the pickup schedules of the one or more service vehicles, and transportation routes of the one or more service vehicles an updated route to operate a lower amount of time on public roadways; and update the provider portal with the updated route.

9. The method of claim 8, wherein determining when the one or more service vehicles are not operating on public roadways includes referencing location signals from a locating device with stored maps used to determine when the one or more service vehicles are not operating on public roadways.

10. The method of claim 8, further including automatically calculating the portion of the fuel tax that should be credited back based on one or more of fuel tax regulatory information, vehicle location data, travel paths, schedules of stops of the one or more service vehicles, and fuel onloading information.

11. The method of claim 10, further including determining the portion of the amounts of fuel consumed by the one or more service vehicles based at least in part on a fuel signal indicative of the amounts of fuel consumed by the one or more service vehicles.

12. The method of claim 9, further including receiving information regarding fuel tax regulations via a government agency portal.

13. The method of claim 8, further including receiving manual input indicative of observed operation of a first service vehicle of the one or more service vehicles, wherein determining the portion of the amounts of fuel consumed by the first service vehicle when the first service vehicle is not traveling on public roadways includes determining the portion of the amounts of fuel consumed by the first service vehicle when the first service vehicle is not operating on public roadways based further on the manual input.

14. The method of claim 8, the method further includes:
   summing all of the portions of the amounts of fuel consumed by each of the one or more service vehicles for a specified period of time; and
   automatically applying for corresponding credits at a scheduled time.

15. A non-transitory computer readable medium containing computer-executable programming instructions for reducing fuel tax costs comprising:
   receiving data related to a real time location of one or more service vehicles during operation from an electronic receiver configured to triangulate the real time location of the one or more service vehicles based on signals received from three or more satellites, and collecting real time amounts of fuel consumed by the one or more service vehicles, pickup schedules of the one or more service vehicles, and transportation routes of the one or more service vehicles;
   determining, based on the data related to the real time location of the one or more service vehicles during operation and the data related to the amounts of fuel consumed by the one or more service vehicles during operation, a portion of the amounts of fuel consumed by each of the one or more service vehicles when the one or more service vehicles are not located on public roadways; and
   determining a fuel tax paid on the amounts of fuel consumed by the one or more service vehicles;
   determining a portion of the fuel tax that should be credited back based on the portion of the amounts of fuel consumed by the one or more service vehicles when the one or more service vehicles are not located on public roadways;
   displaying an indication of the portion of the fuel tax that should be credited back to be displayed on a provider portal;
   automatically applying for the portion of the fuel tax that should be credited back;
   determining based on data related to real time location, the pickup schedules of the one or more service vehicles, and transportation routes of the one or more service vehicles an updated route to operate a lower amount of time on public roadways; and
   providing the updated route to the provider portal.

* * * * *